United States Patent
Sullivan et al.

(10) Patent No.: US 6,427,492 B1
(45) Date of Patent: Aug. 6, 2002

(54) BUSHING INCLUDING A TERMINAL EAR

(75) Inventors: Timothy A. Sullivan; Jack L. Emerson, both of Newark; Ramin Dowlati, Gahanna, all of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/539,956

(22) Filed: Mar. 31, 2000

(51) Int. Cl.$^7$ ............................................. C03B 37/08

(52) U.S. Cl. ........................................... 65/495; 65/499

(58) Field of Search .................... 65/495, 499

(56) References Cited

U.S. PATENT DOCUMENTS

| | | |
|---|---|---|
| 3,511,916 A | 5/1970 | Sinclair et al. |
| 3,512,948 A | 5/1970 | Glaser et al. |
| 4,099,948 A | 7/1978 | Thomas |
| 4,272,271 A | 6/1981 | Thompson |
| 4,516,995 A * | 5/1985 | Bhatti et al. |
| 4,634,460 A | 1/1987 | Fowler |
| 4,717,411 A | 1/1988 | Fowler |
| 4,740,224 A * | 4/1988 | Fowler |

FOREIGN PATENT DOCUMENTS

EP    0 229 648    7/1987

* cited by examiner

*Primary Examiner*—Christopher A. Fiorilla
(74) *Attorney, Agent, or Firm*—Inger H. Eckert; Stephen W. Barns (57) ABSTRACT

A bushing including a terminal ear and a method of manufacturing the bushing are disclosed. The bushing includes a bushing body which can include side plates, end plates, a bottom plate, and terminal ears coupled to the bushing body. Clamps are attached to the terminal ears to supply electrical current to the bushing to maintain the glass inside in a liquid state. Each terminal ear includes an upper portion and a lower portion. The upper portion is coupled to a side plate of the bushing. A clamp is attached to the lower portion of the terminal ear. The upper and lower portions are oriented at an angle with respect to each other. Support portions are provided along the side edges of the upper portions of the terminal ears. Support portions stiffen the terminal ear, thereby increasing its resistance to bending and fatigue stresses. Support portions do not contact the bushing and therefore do not directly conduct current to the bushing. Accordingly, the temperature of the support portions during operation of the bushing will be lower than the conducting portion of the terminal ears. Since the support portions operate at a lower temperature, the thermal degradation of the terminal ear is reduced.

17 Claims, 6 Drawing Sheets

BUSHING INCLUDING A TERMINAL EAR

TECHNICAL FIELD AND INDUSTRIAL APPLICABILITY OF THE INVENTION

This invention relates generally to an apparatus for producing continuous glass filaments, and in particular, to an improved bushing including terminal ears that reduce the mechanical and thermal degradation experienced during the operation of the bushing and lengthen the operating life of the bushing and a method of manufacturing the improved bushing. The invention is particularly useful in the production of continuous glass filaments for use in a wide range of applications including textiles and reinforcements.

BACKGROUND OF THE INVENTION

A strand of glass filaments is typically formed by attenuating molten glass through a plurality of orifices in a bottom plate of a bushing. The filaments are attenuated by applying tractive forces to the streams of glass, so as to attenuate the streams from the orifices in the bottom plate. The filaments are coated with a size or binder material that serves to provide a lubricating quality to the individual filaments to provide them with abrasion resistance or to impart a desired array of properties to the strand in its ultimate application. The size material is applied after the filaments are formed. The filaments are gathered in parallel relationship to form a strand.

Bushings condition the molten glass to a uniform temperature so the filaments are attenuated with uniform diameters. The temperature of the molten glass must be high enough to maintain the glass in a liquid state.

Bushings experience a corrosive operating environment imposed by the molten glass and elevated operating temperatures which accelerate the degradation of its electrical and mechanical components. One solution to the degradation is to fabricate the bushing assembly from precious metals such as platinum or platinum alloys. However, the operating environment affects these materials as well. Oxidation loss, volatilization, and migration of the precious metal into surrounding refractory materials as well as sagging or creep (high temperature deformation) of the bushing decrease bushing performance as well as shorten the useful life of the bushing assembly.

Conventional bushings typically include side plates, end plates, and a bottom plate defining a bushing body therebetween. The bottom plate may include more than 4,000 orifices or nozzles, preferably all at or close to a uniform temperature. The bottom plate may be referred to as a nozzle plate or tip plate as well.

Such bushings include terminals (referred to as "terminal ears") coupled to each end plate. Both the bushing and the terminal ears are typically made of a precious metal, such as a platinum containing material like platinum or a platinum alloy. An example of a platinum alloy is a platinum-rhodium alloy. Electric clamps are connected to the terminals to deliver a heating current to the bushing to maintain the glass in its molten condition. The clamps are typically water-cooled. The current flows through the bushing side plates, end plates, and bottom plate which are conductive.

Bushing terminal ears have a wide range of shapes and are often wide and relatively thin. The terminal ears can extend substantially along the width of the bushing end plate and provide a relatively large area for engagement by an electrical clamp that supplies the current.

A common terminal ear design includes an upper portion coupled to the bushing and a lower portion to which electrical clamps are coupled.

In addition to tip section heat pattern, two design considerations for bushing terminal ears are the mechanical and thermal degradations of the terminal ears over time. During operation of the bushing, the upper terminal ears experience a combination of mechanical fatigue and thermal effects due to the high operating temperatures of the bushing.

The mechanical fatigue of the terminal ear is related to high levels of bending stress or vibrational fatigue during operation of the bushing. Since the ear is wide and thin, it tends to bend when the clamp is secured to it. A fissure in the terminal ear may begin and develop into a crack.

In addition to the mechanical fatigue, the terminal ear experiences thermal degradation. When some metals are heated to a high temperature, they volatize or evaporate. Platinum and rhodium are such metals. Since the bushing and the terminal ear operate at high temperatures, the platinum and rhodium present on the edges of the terminal ears gradually volatizes. The loss of alloy from the boundary of the ear promotes the formation of a fissure, which may expand into a crack. Mechanical working of the ear may increase the fissure and the terminal ear will eventually fail.

Several attempts have been made to solve the problem of cracking in the terminal ears. One design approach is to heal or repair cracks with molten wire, similar to soldering. This solution is a temporary fix and does not address the thermal degradation of the terminal ear.

Another design approach is to redesign the power delivery system to reduce vibration and stress on the ear. This can reduce but not eliminate the problem.

Another design approach involves the use of a gusset between a terminal ear and the end plate or the side plate of a bushing. U.S. Pat. No. 4,634,460 to Fowler (Fowler) discloses a drain bushing with a gusset in contact with each terminal ear to provide support for the ears. The ears and the gussets are integrally connected to the bottom plate of the bushing so that the heating current supplied by the clamps through the terminal ears is delivered to the bushing through the gusset and the terminal ears. The gussets effectively widen the contact between the terminal ears and the bushing. However, the gussets provide limited support to the terminal ear and the gusset. Also, the design approach of Fowler does not address the thermal degradation of the terminal ears.

Another design approach is to thicken the entire terminal ear to stiffen the ear. However, thicker terminal ears adversely effect the desired heating pattern of heat distribution because of undesirable low operating current levels.

A need exists for an economical way to improve the resistance of terminal ears to the mechanical and thermal degradations caused by the operating temperature of the bushing. Similarly, a need exists for an economical way to enhance the service life of a bushing.

SUMMARY OF THE INVENTION

The shortcomings of the prior art are overcome by the disclosed bushing including a terminal ear and the method of manufacturing the bushing. The bushing includes a bushing body (which can include side plates, end plates, a bottom plate) and terminal ears coupled to the bushing body. Clamps are attached to the terminal ears to supply electrical current to the bushing to maintain the glass inside in a liquid state and thermally condition it to be fiberized.

Each terminal ear includes an upper portion and a lower portion. The upper portion is coupled to a side plate of the bushing. A clamp is attached to the lower portion of the terminal ear. The upper and lower portions are oriented at an angle with respect to each other.

Support portions are provided along the side edges of the upper portions of the terminal ears. Support portions stiffen the terminal ear, thereby increasing its resistance to bending and fatigue stresses. Support portions also serve as heat sinks by providing additional mass and surface area at the edges of the terminal ears. Heat may be absorbed from the conducting portion by the support portions because of the additional mass. The increase in surface area facilitates the cooling of the edges of the terminal ear through radiation and convection.

Support portions do not contact the bushing end plate and therefore do not conduct current to the bushing body. Accordingly, the temperature at the edge of the support portions during operation of the bushing will be lower than the conducting portion of the terminal ears. Since the support portions operate at a lower temperature, the thermal degradation of the terminal ear is reduced.

DETAILED DESCRIPTION AND PREFERRED EMBODIMENTS OF THE INVENTION

A strand may be formed from a group of filaments or fibers that are typically attenuated from a source of material. For glass strands, molten glass is delivered to a bushing that is electrically heated to maintain the glass in its molten state. The glass is pulled or attenuated as filaments from orifices in a bottom plate of the bushing.

Figure 1:
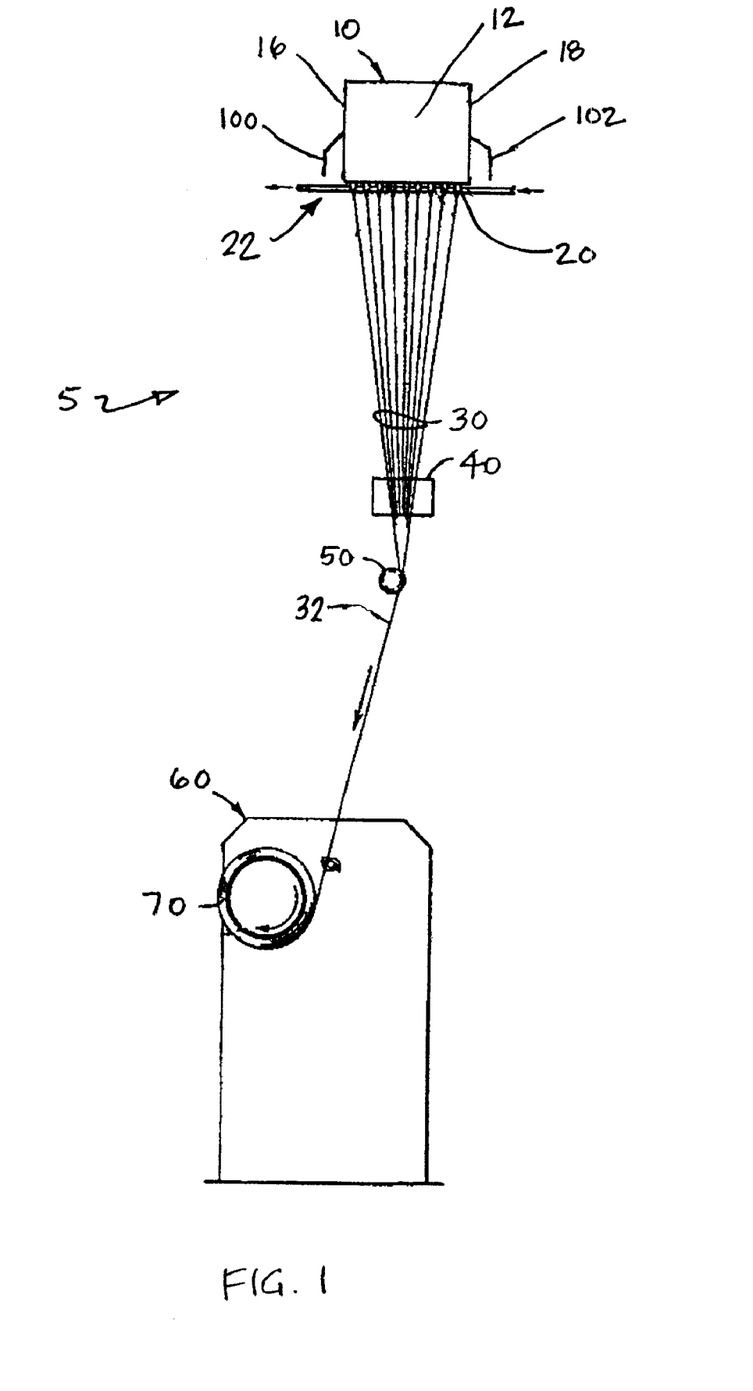
FIG. 1 is a schematic view of a conventional fiberglass forming system.

A conventional filament forming system is shown in FIG. 1. The filament forming system 5 includes a bushing 10 having a number of orifices through which a plurality of streams of molten glass are discharged. The orifices may be extended by hollow tips.

Glass filaments 30 are attenuated from the bottom plate of bushing 10 by a winding apparatus 60. Since the bushing 10 operates at high temperatures, a cooling system 22 is used to control the temperature of the bushing bottom plate and reduce any variance in the filaments due to a temperature gradient. As the artisan will appreciate, cooling systems may use air and/or water to control the temperature.

A downward force is applied to pull the filaments 30 from the bushing 10. In the illustrated forming system, filaments 30 are attenuated from the bushing 10 by a winding apparatus 60 that winds the filaments 30 in the form of a strand 32 around a collet to form a cylindrical package 70 as shown in FIG. 1.

Figure 2:
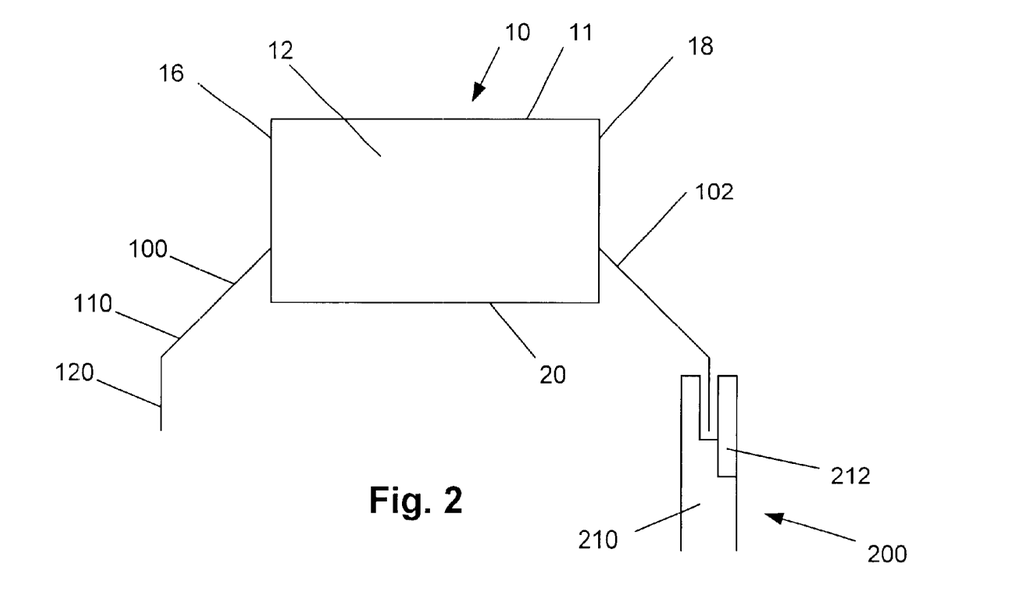
FIG. 2 is a schematic side view of a conventional bushing.
Figure 3:
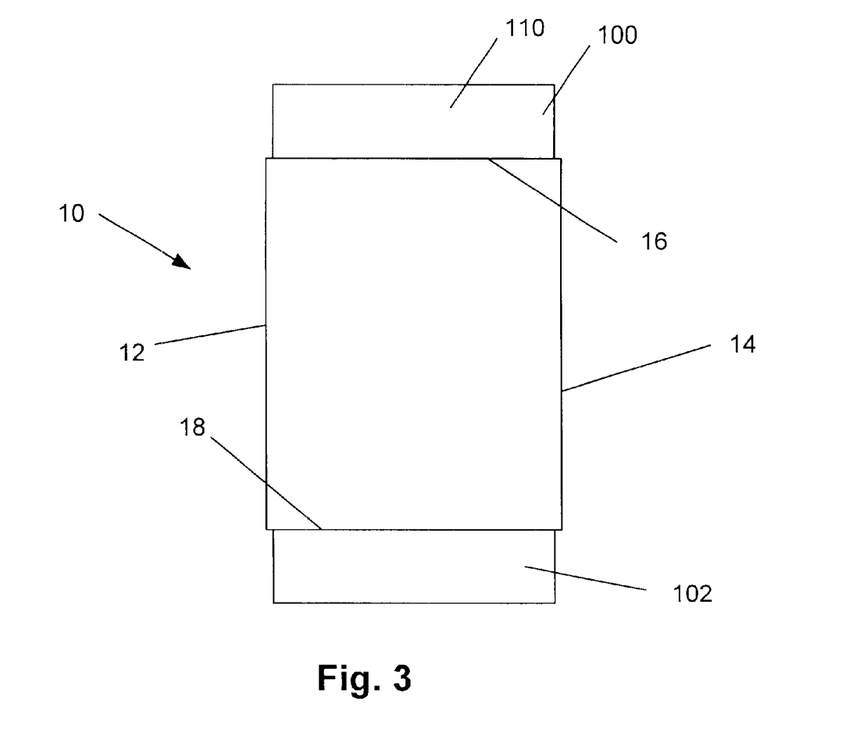
FIG. 3 is a schematic top view of the bushing of FIG. 2.

The bushing 10 includes a bushing body and terminal ears 100, 102. Bushing body 11 may be of any suitable structure, and in the illustrated embodiment includes side plates 12, 14, end plates 16, 18, and a bottom plate 20 as shown in FIGS. 2 and 3. The side plates 12, 14, end plates 16, 18, and bottom plate 20 define a cavity for retaining a supply of molten glass.

Terminal ears 100, 102 are coupled to bushing body 11 at any suitable location. In the illustrated embodiment, the terminal ears 100, 102 are coupled to end plates 16, 18, respectively. Each terminal ear 100, 102 includes an upper portion 110 and a lower portion 120. The terminal ears 100, 102 are relatively thin, wide plates that extend substantially the entire width of the end plates 16, 18.

During operation, a terminal clamp 200 is attached to each terminal ear 100, 102 to supply an electric current to the bushing 10. The terminal clamp 200 includes portions 210, 212 that are secured together by a fastener, such as a bolt, to clamp to the terminal ear. For reasons of simplicity only, one terminal clamp 200 is shown in FIG. 2.

As appreciated by the skilled artisan, the terminal ear is subjected to bending forces and fatigue due to the weight of the terminal clamp 200 that is attached to the terminal ear. The terminal ear experiences additional forces from the subsequent attachment and removal of the clamp from the ear and any vibration within the bushing circuit. These forces cause mechanical bending and working of the ear and eventually create fissures or cracks. Fissures and cracks typically initiate on the outside edges of the ears and ultimately result in the failure of the terminal ear if not treated or repaired.

When the current flows from the clamp through the terminal ears, the temperature of the terminal ears increases due to resistive heating. Heat may also be conducted from the bushing body to the ears via their connection to the bushing body. When the terminal ears are at a high temperature for a long period of time, the alloy in the terminal ear begins to volatize as previously discussed. The depletion of alloy at the edge of the ear can produce a fissure. The fissure may increase through mechanical working or additional thermal degradation. When a terminal ear fails or breaks, the bushing is shut down and the filament forming process is stopped, resulting in a loss of production.

The terminal ear of the invention includes a support member coupled to the outside edges of the terminal ear to increase the bending moment of inertia of the ear, which increases resistance to bending and vibrational fatigue. The support member also functions as a heat sink by providing additional mass and increasing the surface area at the edges of the terminal ear. The mass of the support member enables the transfer of heat from the conducting portion via conduction. The increase in surface area facilitates the radiation and convection of heat from the edges of the terminal ear.

In the illustrated embodiment, the support member is implemented as an I-shaped beam welded to the terminal ears. However, the support member can be configured with different geometries, can be coupled at other locations on the terminal ear, and can be coupled with other techniques. The support portions or members have an I shaped cross-section.

The upper portion of the terminal ear is mounted at an angle with respect to the end plate of the bushing. The weight of the terminal clamp on the terminal ear causes the upper portion to bend. The support members stiffen the upper portion of the terminal ear.

The support portions perform multiple functions relative to the thermal degradation of the terminal ears. First, the support portions are not in contact with the end plates of the bushing. Since electrical current typically flows in a direct path between two points, the current flows preferentially through the conducting portion of the terminal ear which is in contact with the end plate of the bushing and to a lesser extent through the support portions. As a result, the support portions do not experience as much resistive heating and therefore are at a lower temperature than the conducting portion of the terminal ear. The lower temperature reduces the volatilization of alloy from the terminal ear. Also, since the support portions are not in contact with the bushing end plates, they do not conduct heat from the bushing body and therefore are not heated by the bushing or influence the heat pattern of the bushing.

Second, the amount of current that flows through the terminal ear is not affected by the terminal ear support portions. Since the amount of energy consumed in resistive heating is the same, support portions provide additional mass to the terminal ear and the total overall temperature of the terminal ear edges is reduced. The lower operating temperature on the edges extends the life of the terminal ears and the bushing.

Third, as discussed above, the support portions enable the conduction of heat from the conducting portion. Also, support portions increase the amount of surface area at the edges of the terminal ear. Heat is removed from the support portions by radiation and convection. By increasing the surface area, more heat can be removed from the edges of the terminal ear than in conventional terminal ears.

With these general principles identified, selected implementations of these principles in currently preferred embodiments are set forth below.

Figure 4:
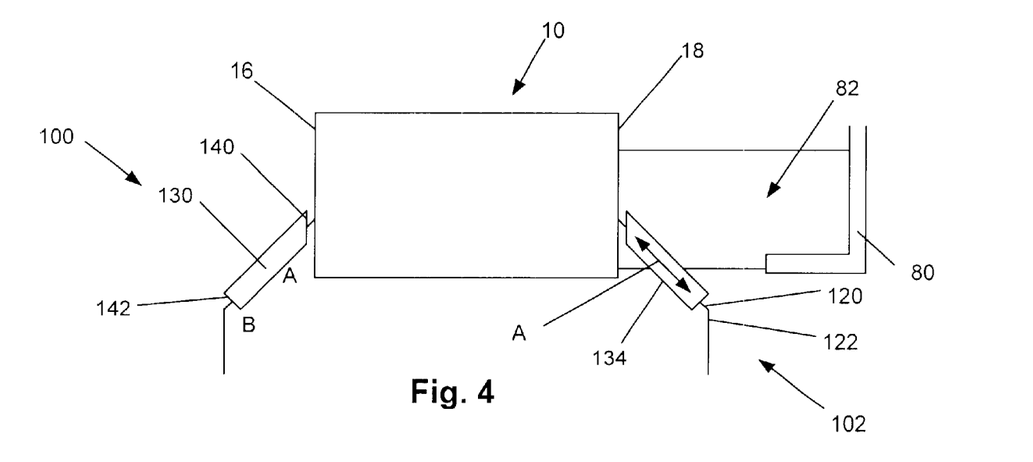
FIG. 4 is a schematic side view of a bushing embodying the principles of the invention.

A bushing for a filament forming system embodying the principles of the invention is illustrated in FIGS. 4–8. As shown in FIG. 4, the bushing 10 includes terminal ears 100, 102 coupled to the bushing body 11 at end plates 16, 18, respectively. The terminal ears are typically welded to the end plates.

Each terminal ear 100, 102 includes an upper portion 110 and a lower portion 120. The upper portion 110 extends from the end plate at an angle A. Angle A ranges from 30° to 75°, and is preferably approximately 60°. The lower portion 120 extends from the upper portion 110 at an angle B. Angle B ranges from 105° to 150°, and is preferably approximately 120°.

The upper and lower portions 110, 120 of the terminal ears include conducting portions 116, 122, respectively. The current supplied from the terminal clamp flows through the conducting portions 116, 122 to the bushing 10.

The bushing is typically surrounded by refractory materials to provide thermal and electrical insulation as well as mechanical support for the bushing. The filament forming system 5 includes a bushing frame 80 that supports the bushing 10 in a castable refractory 82 as shown in FIG. 4. (For simplicity of illustration, the refractory 82 and frame 80 are shown on one side of the bushing 10.) As described in greater detail below, the upper portions 110 of the terminal ears 100, 102 are cast in the refractory 82.

Figure 5:
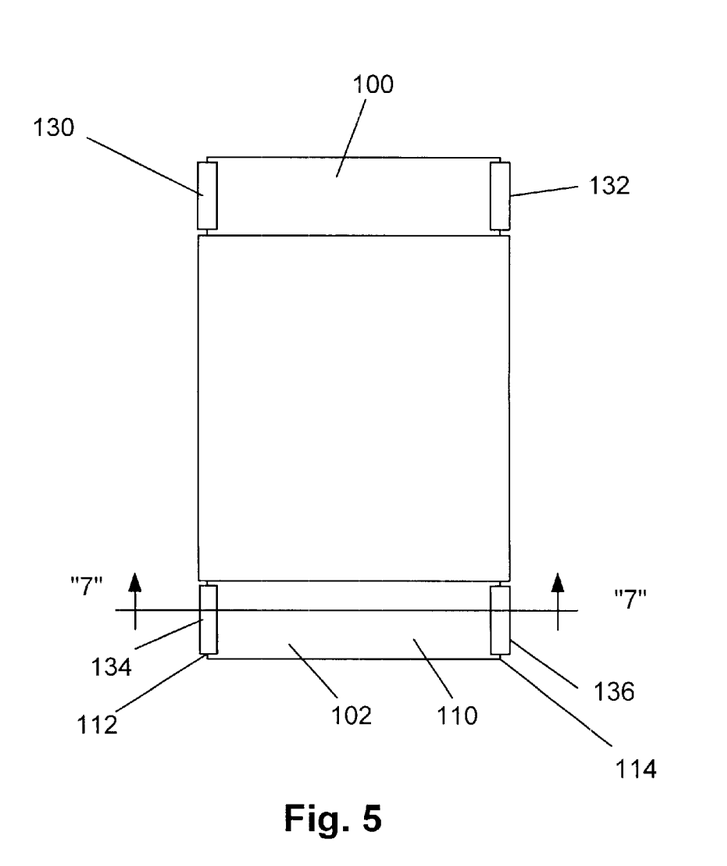
FIG. 5 is a schematic top view of the bushing of FIG. 4.
Figure 6:
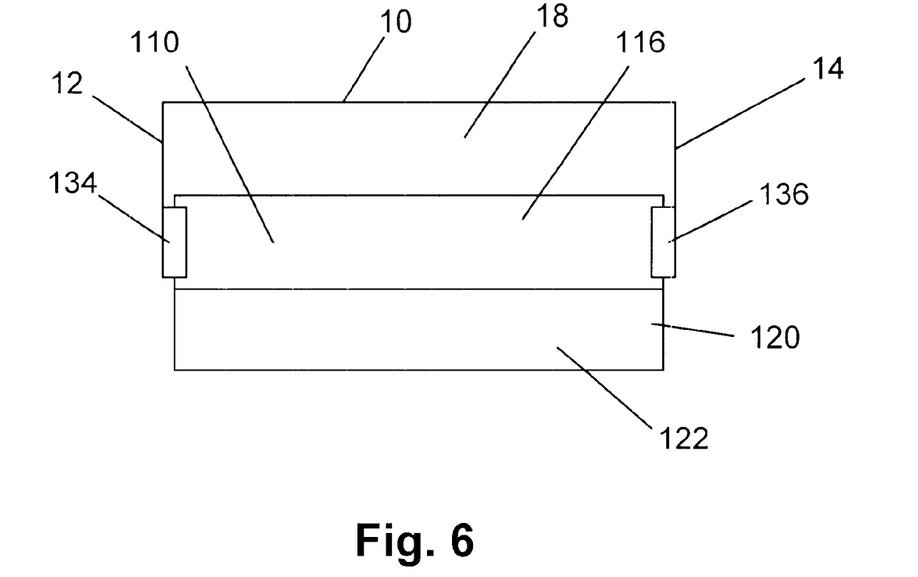
FIG. 6 is a schematic end view of the bushing of FIG. 4.

Bushing terminal ears 100, 102 include support portions 130, 132, 134, 136 as shown in FIGS. 4–6. Each terminal ear upper portion includes side edges 112, 114 as shown in FIG. 5. The support portions are coupled to the outer side edges 112, 114 by welding or other suitable methods. The terminal ears extend along the end plates of the bushing 10 and have a longitudinal axis A, which lies in the plane of the upper portion of the terminal ears as shown in FIG. 4. The support portions 130, 132, 134, 136 are preferably oriented substantially parallel to the longitudinal axis of the terminal ears.

Each support portion includes ends 140, 142 as shown in FIG. 4. End 140 is formed parallel to the end plate of the bushing. The support portion is coupled to the terminal ear so that end 140 is spaced from the end plate. The end 140 and the end plate 16 are preferably spaced apart sufficient to avoid contact with the end plate over the range of operating conditions and deflection due to applied loads, such as 0.12 to 0.25 in. (0.3 to 0.6 cm). Since the support portions are not in contact with the bushing end plates, the support portions do not conduct current to the bushing and the heating pattern of the bushing is not changed.

Figure 7:
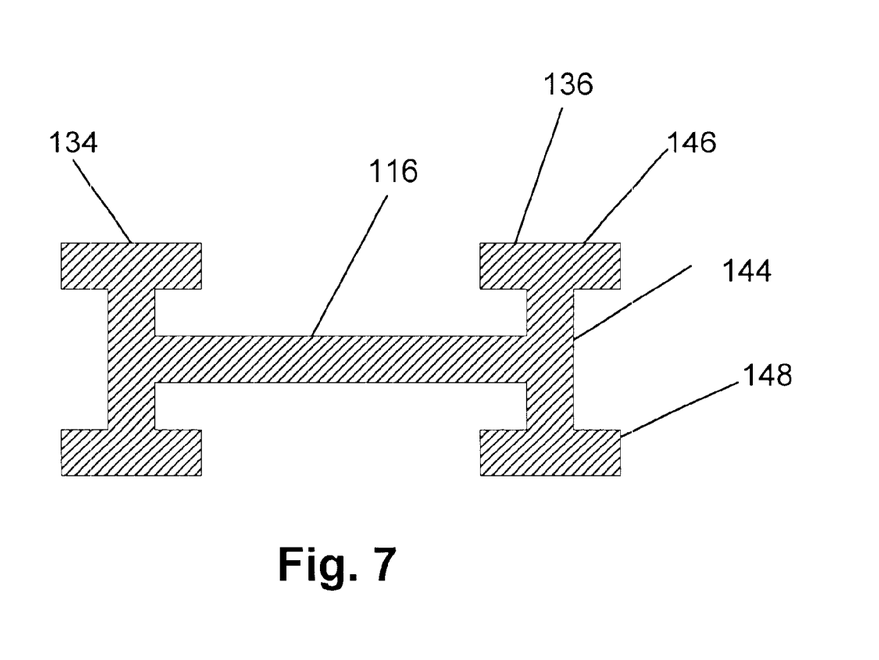
FIG. 7 is a cross-sectional view of the terminal ear taken along the lines "7"—"7" in FIG. 5.
Figure 8:
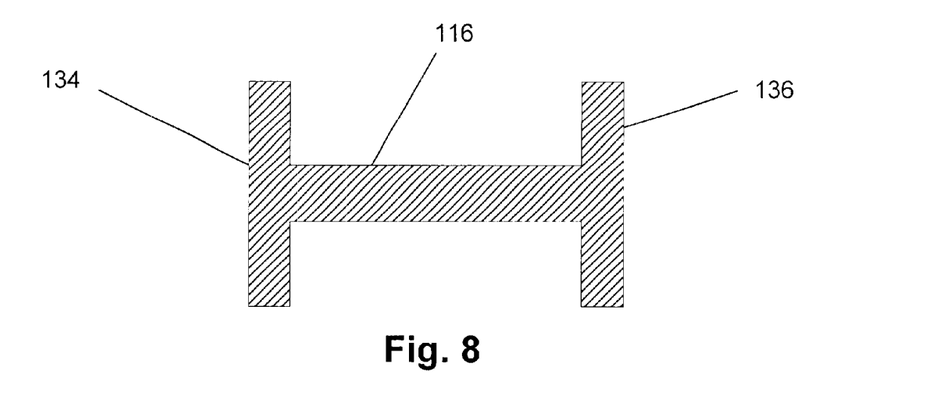
FIG. 8 is a cross-sectional view of an alternative embodiment of a terminal ear.

A terminal ear embodying the principles of the invention is shown in FIG. 7. Each support portion 134, 136 resembles an I beam with an I-shaped cross section (in a plane perpendicular to the longitudinal axis) including a body 144 and flanges 146, 148 as shown. The cross-section of the conducting portion (in a plane perpendicular to the longitudinal axis A) is preferably rectangular.

The moment of inertia of the cross-section of the support portions is preferably different than that of the conducting portion cross-section. The moment of inertia of a terminal ear with the support portions is greater than the moment of inertia without the support portions because the support portions include mass that is offset from a plane defined by the conducting portion. In the illustrated embodiment, the moment of inertia of each support portion is greater than that of the conducting portion.

The support portion is continuously welded to the side of the ear on both the upper and lower edges. Preferably, the terminal ear conducting portions and the support portions are symmetric about a common axis.

Figure 9:
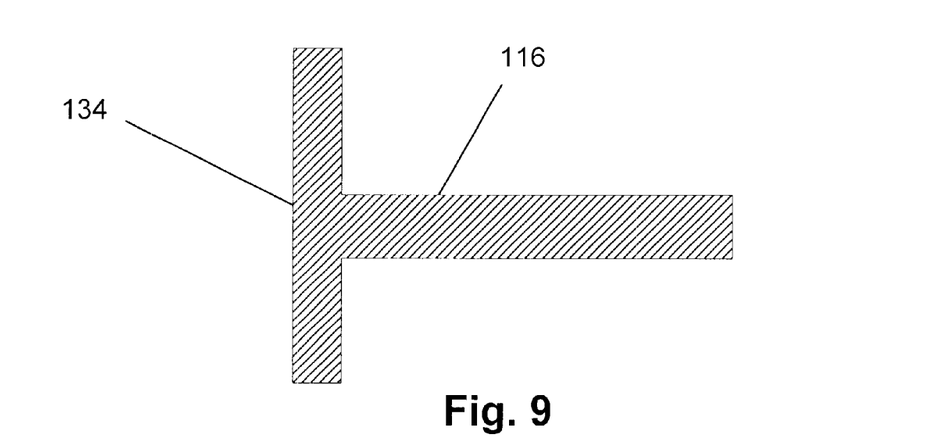
FIGS. 9–12 are cross-sectional views of alternative embodiments of a terminal ear.
Figure 10:
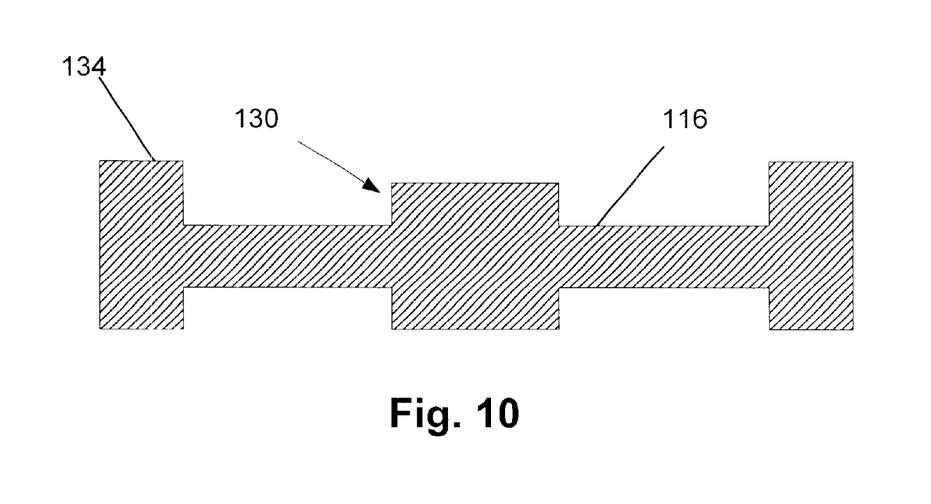
Figure 11:
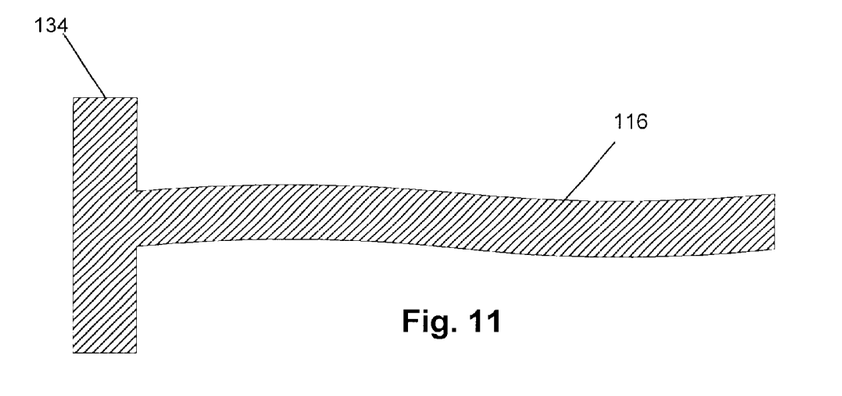
Figure 12:
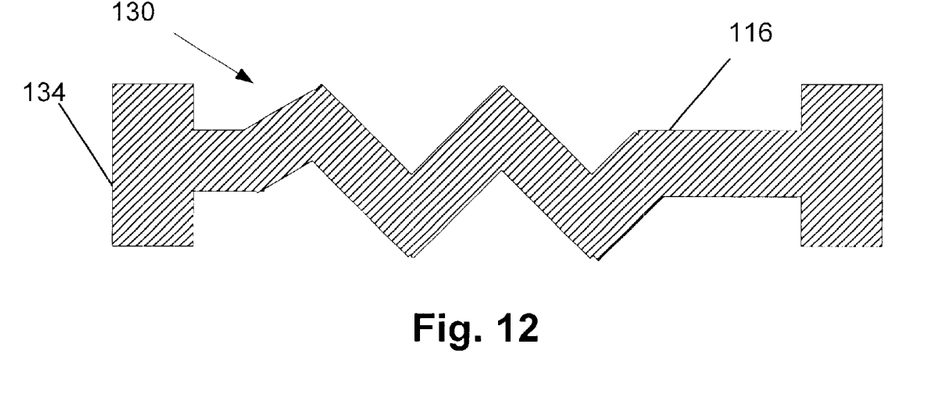

Alternative embodiments of a terminal ear embodying the principles of the invention are shown in FIGS. 8–12. In FIG. 9, each support portion 134, 136 is a flat plate that is welded to an outer edge of the terminal ear. In FIG. 10, the support portion is located along the center of the conducting portion. In FIG. 11, the conducting portion of the terminal ear has an arc shaped cross-section. In FIG. 12, the conducting portion of the terminal ear has a cross-section that increases the resistance of the ear to bending.

The manufacturing of the bushing is now explained. The body of the bushing is formed by coupling the end plates, side plates, and bottom plate together by welding or other similar methods as appreciated by the skilled artisan. The upper and lower portions of the terminal ears are coupled together at an angle with respect to each other. The top edge of the upper portion is then coupled to a bushing end plate. After the terminal ears are coupled to the bushing, the support portions are welded to the outer side edges of the terminal ears.

The bushing is coupled to a bushing block (not shown) and positioned inside of a bushing frame. After the bushing is in its final position, a castable refractory material is poured into the cavity between the bushing and the bushing frame. The castable refractory is poured level with the tip section of the bottom plate. The refractory extends below the connection of the terminal ears, preferably 0.5 in. (1.3 cm), as shown in FIG. 4. Part of the terminal ears, approximately 1 in. (2.5 cm), and support portions are embedded in the refractory.

During operation of the bushing, terminal clamps are coupled to the lower portions of the terminal ears. An electric current is supplied to the terminal clamps from a source to heat the glass in the bushing.

The components of the bushing terminal ear including the support member are preferably a precious metal, such as a platinum-rhodium alloy.

The artisan will also appreciate that there are many possible variations on the particular embodiment described above that would be consistent with the principles of the invention.

The terminal ears may include a single support portion coupled to only one side of the ears. Also, the support members may be coupled to the terminal ears at locations in addition to the side edges. For example, a support member may be positioned in the middle of the conducting portion.

The support members may be formed integrally with the terminal ear. Also, the terminal ears may include support portions on the lower portions of the terminal ears.

The cross-section of the support members may be I-shapes, outwardly or inwardly extending V-shapes or U-shapes, or any other shape that increases the moment of inertia of the conducting portion.

The upper and lower portions of a terminal ear may be coplanar. In addition, the upper and lower portions of the terminal ears may be integrally formed.

The bushing may be any geometric shape, such as rectangular, square, and circular. In addition, the conducting portion of the terminal ears may be nonplanar, such as an arc shape or any other shape that would increase the bending resistance of the conducting portion.

The support portions may be coupled to the terminal ears before the terminal ears are coupled to the bushing. Also, the terminal ears may be coupled to the side plates of the bushing in addition to or in lieu of the end plates.

We claim:

1. A terminal ear for conducting electrical current to a bushing, the terminal ear comprising:
    a conducting portion having a longitudinal axis, being coupleable to the bushing at a first end of said conducting portion, and having a first cross-section in a plane perpendicular to said longitudinal axis; and
    an elongate support portion, coupled to said conducting portion, extending substantially parallel to said longitudinal axis, and having a second cross-section in a plane perpendicular to said longitudinal axis, said second cross-section having a moment of inertia greater than a moment of inertia of said first cross-section, said support portion being spaced apart from the bushing.

2. The terminal ear of claim 1, wherein said second cross-section is I-shaped.

3. The terminal ear of claim 1, wherein said support portion is coupled to a side edge of said conducting portion.

4. The terminal ear of claim 3, further comprising a second support portion coupled to a second, opposite, side edge of said conducting portion.

5. The terminal ear of claim 4 wherein said second support portion has a third cross-section in a plane perpendicular to said longitudinal axis, said third cross-section being the same as said second cross-section.

6. The terminal ear of claim 1, wherein said conducting portion includes an upper portion and a lower portion, and said support portion is coupled only to said upper portion.

7. The terminal ear of claim 1, wherein support portion has an upper end proximal to, but spaced from, said first end of said conducting portion.

8. The combination of the terminal ear of claim 1 and a bushing, said terminal ear being coupled to said bushing at said first end of said conducting portion.

9. The terminal ear of claim 1, wherein said first cross-section is rectangular.

10. A terminal ear for conducting electrical current to a bushing, the terminal ear comprising:
    a conducting portion having a side edge, a longitudinal axis and being coupleable to the bushing at a first end of said conducting portion; and
    a heat sink coupled to said side edge of said conducting portion for increasing the transfer of energy from said side edge, said heat sink being spaced apart from the bushing.

11. The terminal ear of claim 10 wherein said heat sink includes an elongate beam disposed substantially parallel to said longitudinal axis.

12. The terminal ear of claim 11 wherein said elongate beam has an I-shaped cross section.

13. The terminal ear of claim 10 wherein said conducting portion has a resistance to bending about an axis perpendicular to said longitudinal axis and said heat sink increases said resistance to bending.

14. The terminal ear of claim 10 wherein said conducting portion has a uniform cross section.

15. A bushing for melting glass, comprising:
    a body, said body including a bottom plate and an end plate; and
    a terminal ear comprising:
        a conducting portion, said conducting portion having a first side edge and a second side edge opposite to said first side edge, said conducting portion being coupled to said end plate; and
        a first plate, said first plate being coupled to said first side edge of said conducting portion, said first plate extending along said conducting portion, said first plate being spaced apart from said end plate.

16. The bushing of claim 15 wherein said terminal ear includes a second plate, said second plate being coupled to said second side edge of said conducting portion, said second plate extending along said conducting portion, said second plate being spaced apart from said end plate.

17. The bushing of claim 15 wherein first plate includes a plate body and said terminal ear includes flanges coupled to said plate body.

* * * * *